United States Patent Office 3,338,939
Patented Aug. 29, 1967

3,338,939
HEXAFLUORO-ARSENIC AND -PHOSPHORIC ACID SALTS OF ALKYLAMINOETHYL METHACRYLATES
Hugh T. Harrison, Tulsa, Okla., assignor to The Dow Chemical Company, Midland, Mich., a corporation of Delaware
No Drawing. Filed May 8, 1964, Ser. No. 366,144
4 Claims. (Cl. 260—440)

The present invention is directed to organic chemistry and is particularly directed to methacrylate compounds of the formula

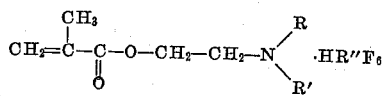

In the above and succeeding formulae, R represents hydrogen or loweralkyl; R' represents loweralkyl; and R'' represents arsenic or phosphorus. The present compounds are liquid or crystalline solid materials, of low solubility in organic solvents and of low to moderate solubility in water. They are useful as parasiticides for the control of a number of mite, insect, helminth, bacterial, and fungal organisms, such as two-spotted spider mite, cottonleaf perforator, and tapeworms. The compounds are also useful when employed as agents to inhibit the nitrification of ammonium-nitrogen-containing compounds or reduced nitrogen fertilizers in the soil.

The compounds of the present invention are prepared by reacting a methacrylate reactant of the formula

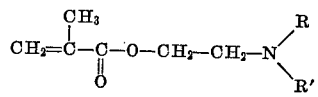

with hexafluoroarsenic or hexafluorophosphoric acid. Conveniently, the reaction is carried out in an inert liquid reaction medium, such as water. The reaction is exothermic and takes place smoothly at temperatures of from −10° to 80° C.; conveniently, however, the reaction is conducted at room temperatures. Good results are obtained when employing equimolecular amounts of the reactants or when employing an excess of the acid reactant.

The hexafluoroarsenic or hexafluorophosphoric acid reactant is usually supplied to the reaction mixture as a liquid. Conveniently, the liquid employed is the commercial product which contains 65 percent $HAsF_6$, 21 percent $H_2O$, and 14 percent related arsenic acids, or the commercial product which contains 65 percent $HPF_6$, 21 percent $H_2O$, and 14 percent related phosphorus acids. In other procedures, a liquid containing one of the acids is prepared in the manner of Nuttall et al. in their preparation of an aqueous solution of hexafluorophosphoric acid. See the Journal of the Chemical Society (London), 1960, pages 4965–4970. In yet other procedures, it is sometimes convenient to employ a solid hydrate form of one of the acids.

In carrying out the reaction, the methacrylate reactant is contacted with one of the acids in any conventional manner, conveniently, by adding one reactant to the other reactant. The temperatures of the resulting reaction mixture can be controlled by regulating the rate of the contacting of the reactants as well as by external cooling. Upon completion of the contacting of the reactants, most of the reaction will have taken place with the production of the desired product. Where optimum yields are desired, it is often convenient that the reaction mixture be allowed to stand for a period of time. Upon completion of the reaction, solvent employed as inert liquid reaction medium can be removed from the reaction mixture by evaporation or distillation under subatmospheric pressure to obtain the product of the present invention as a residue. This product residue can be purified by conventional procedures such as washing with water or suitable organic liquid and recrystallization to obtain a purified product. The products can be employed for the useful purposes of the present invention either as a product residue or as a purified product.

Example 1.—2-dimethylaminoethyl methacrylate hexafluoroarsenate 50 grams of the commerically-available $HAsF_6$ product containing about 65 percent $HAsF_6$, 21 percent $H_2O$, and 14 percent related arsenic acids (equivalent to 0.17 mole of $HAsF_6$) were cooled to a temperature of about 0–5° C. 10 milliliters of 2-dimethylaminoethyl methacrylate (equivalent to about 0.06 mole) were cooled and added portionwise over a period of time to the said aqueous $HAsF_6$ reactant. During the addition, a white precipitate appeared in the reaction mixture. Thereafter, the reaction mixture was permitted to stand for a period of time and subsequently filtered under subatmospheric pressure to obtain the 2-dimethylaminoethyl methacrylate hexafluoroarsenate product as a residue. This product residue was washed with three 25-milliliter portions of diethyl ether at room temperature, and the washed product thereafter subjected to subatmospheric pressure to remove therefrom traces of the diethyl ether. The product was found to be a white crystalline solid material melting at 66–68° C.

In procedures essentially the same as those employed in Example 1, other products of the present invention are prepared as follows:

From 2-dimethylaminoethyl methacrylate and hexafluorophosphoric acid, 2-tert-butylaminoethyl methacrylate hexafluorophosphate product melting at 111–113° C.

From 2-isopropylaminoethyl methacrylate and hexafluoroarsenic acid, 2-isopropylaminoethyl methacrylate hexafluoroarsenate product having a molecular weight of 361.2.

From 2 - methylaminoethyl methacrylate and hexafluorophosphoric acid, white crystalline 2-dimethylaminoethyl methacrylate hexafluorophosphate product melting at 85–87° C. The product is found to have a nitrogen content of 4.52 percent, compared to a theoretical nitrogen content of 4.62 percent.

From 2-methylaminoethyl metharcylate and hexafluorophosporic acid, 2-methylaminoethyl methacrylate hexafluorophosphate product having a molecular weight of 289.2.

From 2-di-sec-butylaminoethyl methacrylate and hexafluorophosphoric acid, 2-di-sec-butylaminoethyl methacrylate hexafluorophosphate product having a molecular weight of 387.4.

From 2-tert-butylaminoethyl methacrylate and hexafluoroarsenic acid, white crystalline 2-tert-butylaminoethyl methacrylate hexafluoroarsenate product melting at 126–128° C.

From 2-methylpropylaminoethyl methacrylate and hexafluorophosphoric acid, 2 - methylpropylaminoethyl methacrylate hexafluorophosphate product having a molecular weight of 333.3. The product has the following formula:

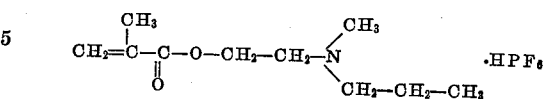

From 2-diethylaminoethyl methacrylate and hexafluoroarsenic acid, 2-diethylaminoethyl methacrylate hexafluoroarsenate product having a molecular weight of 375.2. In a representative preparation, this product was a viscous liquid material.

When one of the present compounds is employed as a parasiticide, the unmodified compound can be utilized. However, the present invention also encompasses the utilization of a compound according to the present invention together with a parasiticide adjuvant. In such utilization, the compound can be dispersed upon a finely divided solid and the resulting preparation employed as a dust. Also, such preparation can be dispersed in water with the aid of a wetting agent and the resulting aqueous dispersion employed as a spray. In other procedures, a product according to the present invention can be employed as a constituent of organic liquid compositions, oil-in-water or water-in-oil emulsions or water dispersions, with or without the addition of wetting, dispersing, or emulsifying agents. In representative operations, a composition containing 25 parts of 2-tert-butylaminoethyl methacrylate hexafluorophosphate per million parts by weight of ultimate composition is applied to a growth medium freshly seeded with cotton seeds, the growth medium held under conditions favorable to the germination of the cotton seeds, and, following germination, the young cotton plants, heavily infested with cottonleaf perforators (*Bucculatrix thurberiella*). As a result of these operations, it is found that the subject compound gives excellent control of cottonleaf perforators for a period of at least 6 weeks following treatment of the growth medium.

I claim:

1. Compound of the formula wherein R represents a member selected from the group consisting of hydrogen and loweralkyl; R′ represents loweralkyl; and R″ represents a member selected from the group consisting of arsenic and phosphorus.

2. 2-dimethylaminoethyl methacrylate hexafluoro phosphate.

3. 2 - tert - butylaminoethyl methacrylate hexafluorophosphate.

4. 2 - diethylaminoethyl methacrylate hexafluoroarsenate.

References Cited

UNITED STATES PATENTS 3,152,160 10/1964 Harrison ----------- 260—440

TOBIAS E. LEVOW, *Primary Examiner.*

W. F. W. BELLAMY, *Assistant Examiner.*

UNITED STATES PATENT OFFICE
CERTIFICATE OF CORRECTION

Patent No. 3,338,939            August 29, 1967

Hugh T. Harrison

It is hereby certified that error appears in the above numbered patent requiring correction and that the said Letters Patent should read as corrected below.

Column 2, line 34, beginning with "From" strike out all to and including "111-113° C." in line 36, same column 2, and insert the following paragraph:

From 2-tert-butylaminoethyl methacrylate and hexafluorophosphoric acid, 2-tert-butylaminoethyl methacrylate hexafluorophosphate product melting at 111-113° C.

Signed and sealed this 15th day of October 1968.

(SEAL)
Attest:

Edward M. Fletcher, Jr.
Attesting Officer

EDWARD J. BRENNER
Commissioner of Patents